United States Patent [19]

Wassermann

[11] Patent Number: 5,607,995
[45] Date of Patent: Mar. 4, 1997

[54] LOW GLOSS COMPOSITIONS FOR HIGH REFLECTANCE FILMS IN THE INFRA RED RANGE

[75] Inventor: Shulamit Wassermann, Haifa, Israel

[73] Assignee: State of Israel- Ministry of Defence, Haifa, Israel

[21] Appl. No.: 583,218

[22] Filed: Jan. 4, 1996

Related U.S. Application Data

[63] Continuation-in-part of Ser. No. 201,647, Feb. 25, 1994, abandoned.

[30] Foreign Application Priority Data

Mar. 25, 1993 [IL] Israel ........................................ 105167

[51] Int. Cl.$^6$ ................. C08K 3/20; C08K 7/00
[52] U.S. Cl. ............... 524/431; 524/430; 524/502; 523/206; 523/223; 525/185; 428/919
[58] Field of Search ................. 524/431, 502; 523/223, 206; 525/185; 428/919

[56] References Cited

U.S. PATENT DOCUMENTS

| | | | |
|---|---|---|---|
| 3,011,993 | 12/1961 | Kapalko et al. | 525/110 |
| 4,442,247 | 4/1984 | Ishikura et al. | 523/414 |
| 4,640,851 | 2/1987 | Pusch | 428/919 |
| 4,684,675 | 8/1987 | Collier | 523/223 |
| 4,916,014 | 4/1990 | Weber et al. | 428/403 |

FOREIGN PATENT DOCUMENTS 092550 12/1989 Israel .

OTHER PUBLICATIONS

*Paint/Coatings Dictionary*, Federation of Soc. for Coatings Tech., p. 203.
*Surface Appearance* by M. Morse, Pigment Handbook, vol. III, p. 341.

Primary Examiner—Tae Yoon
Attorney, Agent, or Firm—Morgan & Finnegan

[57] ABSTRACT

The present invention relates to a paint composition which comprises a binder to impart film forming properties compounded with quasi transparent polyolefin filler particles having a particle size below 110 micrometers, said polyolefin being selected from the group consisting of a polyethylene, a polypropylene, copolymers of ethylene and propylene and mixtures thereoof, said polyolefin filler particles being present in an amount between 0.1% to 10% by weight of the composition. These paint compositions were found to possess low gloss and matte properties at visible and high reflectance in the thermal infra-red wavelengths.

8 Claims, 2 Drawing Sheets

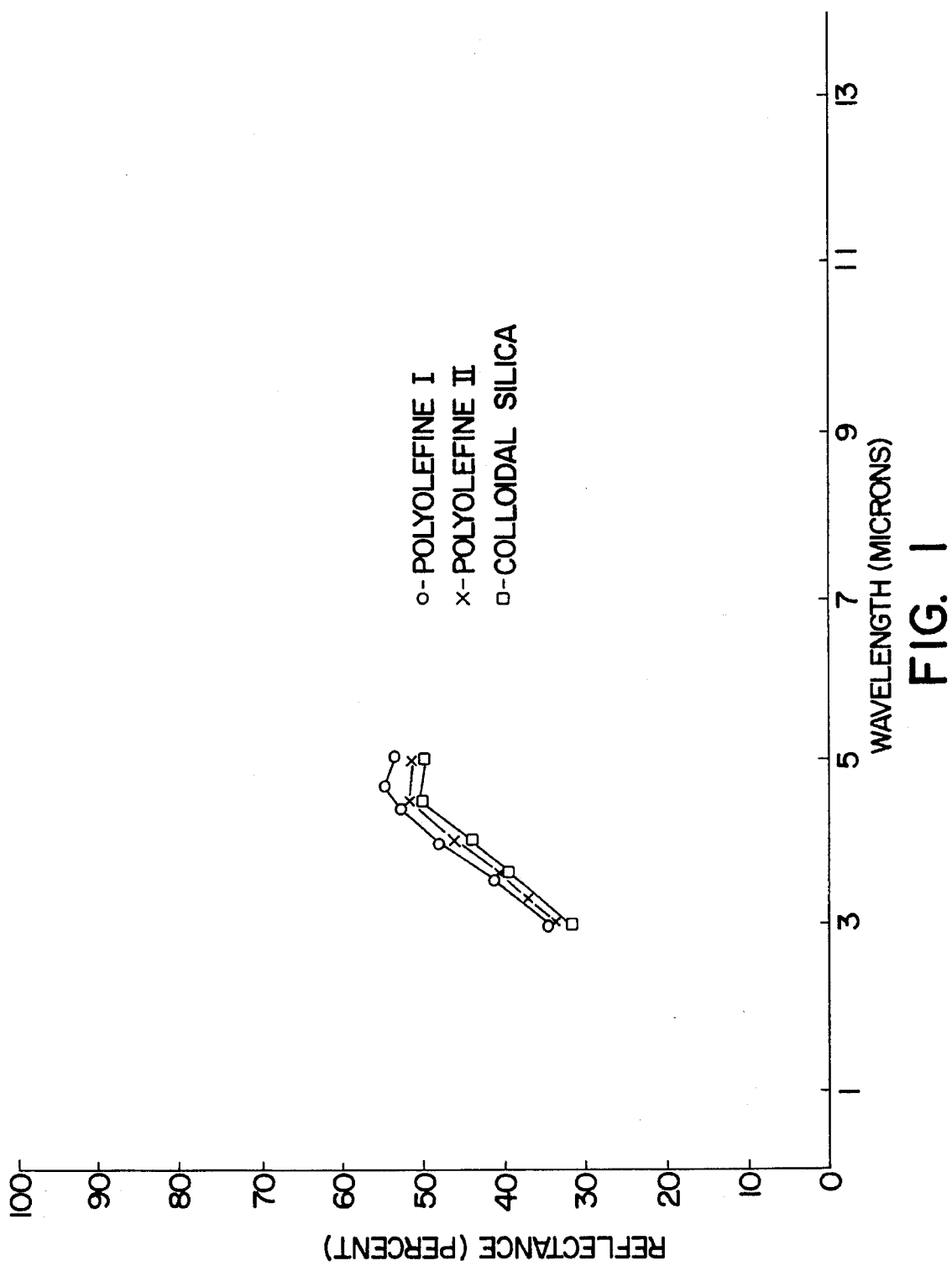

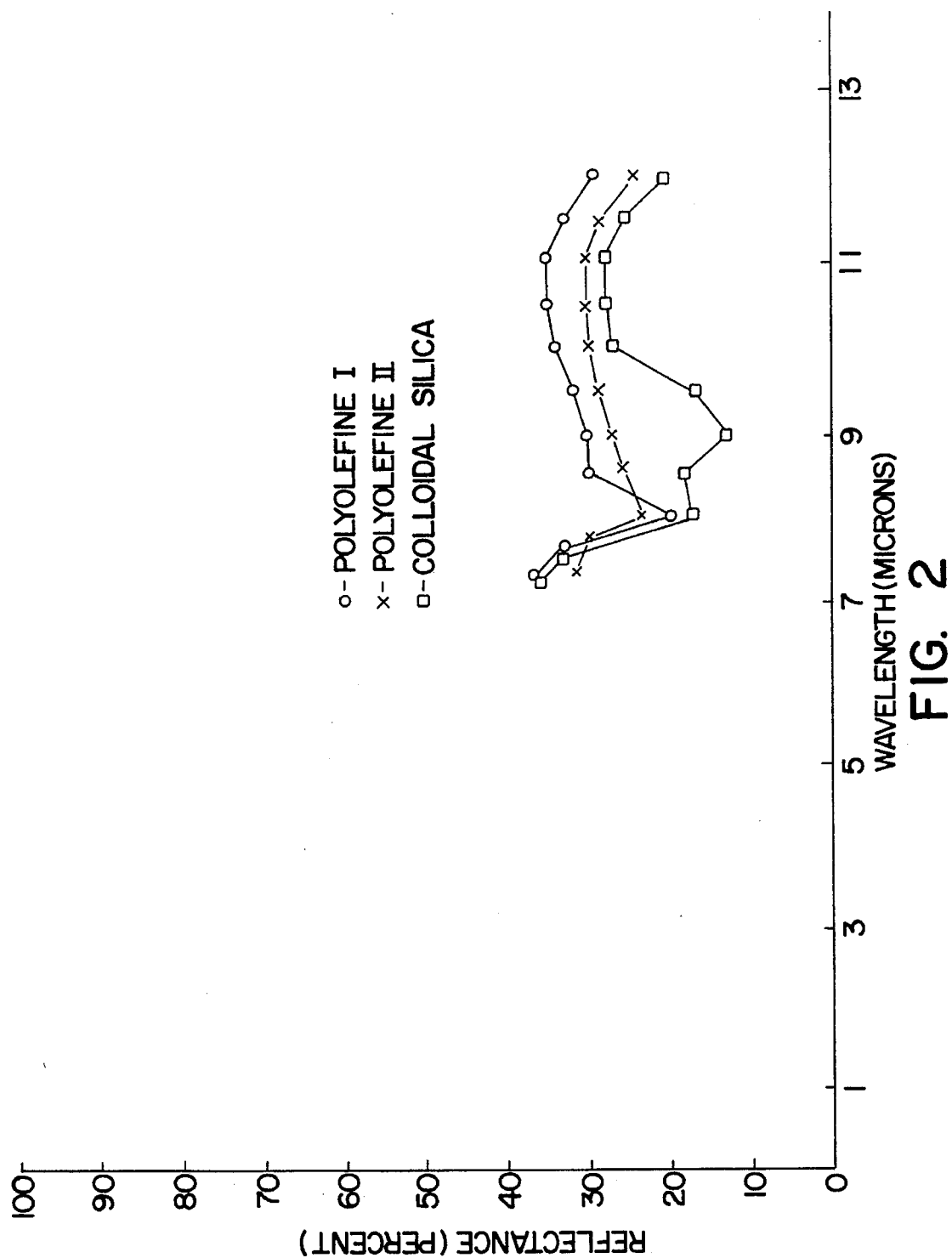

LOW GLOSS COMPOSITIONS FOR HIGH REFLECTANCE FILMS IN THE INFRA RED RANGE

This application is a continuation in part of the parent application Ser. No. 08/201,647, filed on Feb. 25, 1994, now abandoned.

The present invention relates to low-gloss compositions for high reflectance films in the infra-red range. More particularly the invention relates to low-gloss compositions for various dispersions, such as paints or multi layers of oxides possessing a low emissivity in the thermal infra-red range.

BACKGROUND OF THE INVENTION

Paints are known to comprise suspension of one or more colouring constituents in a liquid-forming binder capable of converting to a solid film when a thin layer of it is applied to a metal, wood, stone, paper, or other surface and produces a continuous coloured film. The surface becomes coloured because it absorbs light of certain wavelengths. Many film-forming materials are used both as clear coatings and as pigment/binders mixtures. In case of solution vehicles, the binder is dissolved in a solvent to form a clear, viscous solution, and the pigment or the oxide is dispersed directly into the vehicle solution. On film formation the solidified vehicle serves to bind the pigment, forming a continuous film phase. Vehicles which belong to this category include drying oils, varnishes, synthetic resins and high polymeric materials such as the cellulosic and vinyl polymers.

In another type of vehicle the resins are dispersed in a liquid. Dispersion resins are in the form of tiny, spherical, insoluble particles suspended in a volatile liquid such as water or any volatile solvent. When the liquid evaporates, discrete particles of pigment, oxide or resin remain as a continuous film. Examples of dispersion coatings include the polyvinyl chloride organosols and synthetic rubber latexes.

Paints are normally prepared by mill-base mixing, followed by grinding, then let-down step and final mixing. Modern paints are "tailor-made" coatings which are usually designed by skilled scientists for specific purposes. Thus, there are known various types of paints, such as paints against corrosion, insulating paints which withstand at high temperatures, paints for electric conductance, etc. An important constituent in the paint dispersion is the binder which imparts the film forming properties. Some of the constituents possess different optical functions and are selected according to their spectral properties.

Almost all the paints on the market, comprise pigments and fillers which should fulfill the optical requirements at visible light, i.e. an electromagnetic radiation with a wavelength in the range of 0.4–0.7 micrometers. The three main constituents of the paints are:

(a) Pigments having the function to give the paint the opacity, colour and added durability, by protecting the oil and resin film from ultraviolet light.

(b) Binders, which impart film forming properties.

(c) Fillers, also known as matting reagents which have the property to aid in protecting the paint from weathering of the dyes and also to reduce the gloss of a paint.

When an electro-magnetic radiation hits a certain surface a part of it is reflected and the other part is refracted inside to the subsequent layer, being transmitted or absorbed. The reflected radiation comprises two main components: specular radiation and diffusive radiation. The specular surfaces possess a mirror-like appearance being obtained by volatilization of thin metals particles on a polished substrate.

There are cases when it is most desirable that the layer of the film resulted from a binder, should possess a low gloss property, which is generally achieved by adding a filler material such as, calcium carbonate, silicate, colloidal silica, etc. These compounds are actually used in most of the cases where no particular requirements on their absorption in the infra-red region is imposed. However, in case of films produced by paints which possess a high reflectance in the thermal infra-red range of 3 to 12 micrometers, these materials are not suitable. There are known paints useful for high reflective means which provide colour in the visible range and high reflectivity in the range of 3 to 14 micrometers, comprising paints with a high reflectivity and a suitable carrier, selected from thermosetting or thermoplastic compounds such as: epoxy, acrylic, silicone, polyvinyl chloride, etc.

According to the U.S. Pat. No. 3,001,993 (Kapalko et al) polyethylene particles are used in a resinuous composition, in an mount of between 0.1% to 25% by weight of the composition, to eliminate sagging and sol vent popping present therein. The patent does not deal at all with the problem of reflectivity in the infra-red region. In this patent, there is a copolymerization, i.e. a chemical reaction between the constituents present in the composition i.e. polyethylene and acrylamide.

In the U.S. Pat. No. 4,916,014 (Weber et al) there are described infra-red reflecting paint compositions possessing improved visible transparency, known in the paint trade as "pearlescent". The compositions comprise: small particles of a substrate, a layer of an infra-red reflecting metal coated on the substrate and a layer of a dielectric material coated on the metal. The substrate can be selected from fine particles of mica glass, non-infra-red absorbing silicates and high molecular weight of solid hydrocarbons or a plastic material such as polymethacrylate and polyethylene terephthalate. These materials serve as an inert substrate which holds the infra-red reflecting layers. After its application, the binder constitutes a uniform continuous layer, without reflection and gloss properties. In this manner, the substrate material is completely coated and does not contribute to the spherical properties of the composition. The infra-red reflecting properties are obtained by the metallic layer and the dielectric layer.

In the U.S. Pat. No. 4,640,851 (Pusch) it is described a camouflage screen possessing a wide-band effect ranging from the visual part of the spectrum to the radar region. The material used comprises a base layer, an intermediate homogeneous metal layer and an outer camouflage paint layer, which consists of a binder transparent in the thermal infra-red range. It is mentioned the use of polyethylene or polypropylene fibers as an inert transparent uniform supporting substrate.

In the U. S. Pat. No. 4,442,247 (Ishikura et al) there are described paint compositions containing special types of aqueous resins. As a result of the specific interaction between the two types of resins, stable compositions are obtained which avoid separation of solid material and resin coagulation. Nothing is mentioned in this patent on the optical properties of the resins.

In the U.S. Pat. No. 4,684,675 (Collier), it is described a matte paint film in the visible range, produced by incorporation of polyolefins in general, which include polyethylene, polypropylene, polybutene and polypentene particles.

It is an object of the present invention to provide new compositions posessing film forming properties comprising specific filler additives possessing high reflectance in the thermal infra-red wavelengths. It is another object of the present invention to provide new compositions possessing film forming properties wherein said filler additives decrease the gloss appearance at visible light.

BRIEF DESCRIPTION OF THE INVENTION

The invention relates to a paint composition capable of providing a low-gloss film or coating with a light reflectance in the thermal infra-red wavelengths in the range of 3–5 and 8–12 micrometers comprising: a binder which is not a cationic resin possessing amino group(s), being chemically inert with respect to polyethylene or polypropylene, able to impart film forming properties, and filler particles which satisfy the following:
  (i) are selected from the group consisting of a polyethylene, a polypropylene, copolymers of ethylene and propylene and mixtures thereof, and
  (ii) have a particle size below 110 micrometers, said paint composition having less than 5% gloss measured at 60 degrees and matte properties at visible light. The compositions have an index of refraction of the polyolefin-air of 4% different than that of the binder-air.

DETAILED DESCRIPTION OF THE INVENTION

In the specification, the invention will be illustrated in more detail in respect to paints, but it should be understood that it is applicable also to a mixture of at least two oxides. Typical examples of such oxides are: chromium oxides, nickel oxides, iron oxides, manganese oxides, cobalt oxides, etc.

According to the invention, it was found that these fillers impart varying gloss property at the visible light which reaches even a value of below 1%. Although at this stage a theoretical explanation can not yet be presented, it may be assumed that the low gloss effect results from the random dispersion of the radiation through the mixture and to the particular shape of the above fillers particles. The filler to be added may contain also other additives, as usually added in such formulation, such as surface active agents.

This is in contrast to the known inorganic fillers which impart a low reflectance in the above wavelengths range. Moreover, it was surprisingly found that other compounds, although similar in their structure, such as polybutene or polypentene, impart a low transmission in the above range. In addition to the above main property of high reflectance, the fillers according to the present invention, are possessing the property of compounding with the paint. In this specification, the term of high reflectance refers to an average emissivity of below 0.8. The amount of filler to be added, may be in a broad range of between 0.1% to about 10% by weight of the composition and preferably in the range of between 0.3% to 5% by weight depending on the particular use. Thus for instance, in case when a low gloss of below 2% is desired i.e. matte paint, it is required an amount of filler of about 2% to 4% by weight. The particles of the filler may be spherical or substantially elipsoid, so that the smaller diameter is below 110 micrometers. Also, preferably the surface should be contoured-convexed or platelets, appearing in the pigment film with a random orientation, the particles being not parallel one with another. This orientation also reduces specular reflectance and accordingly imparts low gloss.

DESCRIPTION OF THE FIGURES

FIG. 1, illustrates the reflectance of a paint containing as fillers two types of polyolefin (I is polyethylene and II is a mixture of polyethylene and polypropylene) and colloidal silica as comparison, correlating to wavelength in the range of 3 to 5 microns.

FIG. 2, illustrates the reflectance of pigments containing as fillers two types of polyethylene and colloidal silica as comparison, correlating to wavelength in the range of 8 to 12 microns.

Paints possessing fillers according to the present invention are useful for greenhouses and solar collectors or for camouflage installations, where a shadowless light is required.

The invention will be hereafter illustrated by the following two Examples, without limiting its scope as covered by the appended claims, being understood that these Examples are presented only for a better understanding of the invention. A person skilled in the art after reading the present specification will be in a position to insert slight modifications without being outside the claims.

In the Examples, the percentages are given by weight, unless otherwise stated.

Examples 3, 4 and 5 do not illustrate the invention and are presented only for comparison with other known paint compositions mentioned in the prior art.

EXAMPLE 1

A two-component paint was prepared with the following constituents:

| Part A: | |
|---|---|
| Oil-free polyester: | 20%; |
| Methyl-ethyl ketone: | 7%; |
| Methyl-isobutyl ketone: | 5%; |
| Butyl glycol acetate: | 2%; |
| Xylene: | 4%; |
| Pigments: | 40%; |
| Non-leafing aluminum paste: | 17%; |
| Polyethylene: | 4%; |
| Surface active agent: | 0.4%, and |
| Anti-setting agent: | 0.4%. |
| Part B: | |
| Aliphatic Isocyanate resin | 10% |

The high reflectance at thermal infra-red (3–5 and 8–12 micrometers) of this paint composition are presented in the FIGS. 1 and 2.

EXAMPLE 2

The following reagents were mixed:

| Medium soya oil alkyd 55% in white spirit: | 35% |
|---|---|
| Anionic surfactant (AntiTerra U - BYK) | 0.4% |
| Tio White pigment | 7% |
| Calcined Yellow pigment (Shepherd Y9118) | 15% |
| Calcined green Pigment (Shepherd Y9118) | 7% |
| Polyethylene powder (5 microns particle size) | 3% |
| Aromatic diluent (xylene) | 10% |
| Organo metallic driers (naphthenates), and | 3% |
| Non leafing aluminum paste | 19% |

The reflectance measured in the thermal infra-red range was as follows:

for the range of 3 to 5 microns: 0.5 for the range of 8 to 12 microns: 0.45
The gloss measured at 60 degrees was 1%.

EXAMPLE 3

(for comparison purpose)

A paint composition was prepared according to Example II (Table 3) as described in the U.S. Pat. No. 4,684,675 (Collier).

Under the same conditions, a sample was prepared using the reagents according to the present invention. Gloss was measured at 60 degrees and found to be 14% compared with 4% achieved with the reagents according to the present invention. Of course a value of 14% can not be considered a low gloss.

EXAMPLE 4

(for comparison purpose)

A paint composition was prepared according to Example 1 as described in the U.S. Pat. No. 4,442,247 (Ishikura). Under the same conditions, a sample was prepared using the reagents according to the present invention. Gloss was measured at 60 degrees and found to be 15% compared with 4% achieved according to the present invention.

EXAMPLE 5

(for comparison purpose)

A paint composition was prepared according to Example 1, but instead of polyethylene 4% of another polyolefin, finely divided polybutylene were used. The reflectance in the thermal infra-red range was measured and found to be very low (less than 0.1)

We claim:

1. A paint composition capable of providing a low-gloss film or coating with a light reflectance in thermal infra-red wavelengths in the range of 3–5 and 8–12 micrometers, comprising:

(a) a binder which is not a cationic resin possessing amino group(s), said binder being chemically inert with respect to polyethylene or polypropylene, said binder being selected from the group consisting of an alkyd, acrylic, polyvinyl acetate, a polyurethane, an epoxy resin and mixtures thereof, to impart film forming properties, and (b) 0.1% to 10% by weight of the composition of filler particles having a particle size below 110 micrometers being characterized that said filler comprises a polyolefin selected from the group consisting of polyethylene, polypropylene, copolymers of ethylene and propylene and mixtures thereof, said paint compositions having less than 5% gloss measured at 60 degrees, said paint composition having an index of refraction of the polyolefin-air of 4% different than that of the binder-air, said filler imparting to the composition a matte property at the visible light.

2. The composition according to claim 1, wherein the filler particles are present in the composition in the range of between 0.3% to 5% by weight of the composition.

3. The composition according to claim 1, wherein it further comprises at least one metal oxide.

4. The composition according to claim 3, wherein the metal oxide is selected from the group consisting of chromium oxides, nickel oxides, iron oxides, manganese oxides, cobalt oxides and mixture thereof.

5. The composition according to claim 1, wherein the surface of the filler particles have a substantial spherical shape.

6. The composition according to claim 1, wherein the surface of the filler particles have a substantial elipsoid shape.

7. The composition according to claim 1, wherein the surface of the filler particles is platelets.

8. The composition according to claim 1, wherein the surface of the filler particles is contoured-convexed.

* * * * *